(12) United States Patent
Enomoto (10) Patent No.: US 6,478,143 B1
(45) Date of Patent: Nov. 12, 2002

(54) BELT CONVEYOR HAVING SUPPORT CASING FOR BELT

(75) Inventor: Yukio Enomoto, Gifu (JP)

(73) Assignee: Enomoto Industry Co., Ltd., Gifu-Ken (JP)

( * ) Notice: Subject to any disclaimer, the term of this patent is extended or adjusted under 35 U.S.C. 154(b) by 0 days.

(21) Appl. No.: 09/701,126

(22) PCT Filed: May 25, 1998

(86) PCT No.: PCT/JP98/02277

§ 371 (c)(1),
(2), (4) Date: Nov. 21, 2000

(87) PCT Pub. No.: WO99/61354

PCT Pub. Date: Dec. 2, 1999

(51) Int. Cl.⁷ ................................................ B65G 15/60
(52) U.S. Cl. ..................... 198/838; 198/860.2; 198/841; 198/735.1
(58) Field of Search ............................... 198/725, 735.1, 198/838, 841, 845, 860.1, 860.2, 860.3, 861.1

(56) References Cited

U.S. PATENT DOCUMENTS

| | | | | |
|---|---|---|---|---|
| 3,124,239 A | * | 3/1964 | Kosnylak | 198/838 |
| 3,155,227 A | * | 11/1964 | Wesson | 198/838 X |
| 4,013,167 A | * | 3/1977 | Bourgeois | 198/860.2 |
| 4,932,515 A | | 6/1990 | Stohr | 198/822 |
| 5,788,056 A | * | 8/1998 | Clopton | 198/841 |

FOREIGN PATENT DOCUMENTS

| | | |
|---|---|---|
| DE | 1409754 | 10/1968 |
| FR | 2446783 | 8/1980 |
| JP | 57-135511 | 2/1981 |
| JP | 62-144820 | 9/1987 |
| JP | 2-52813 | 4/1990 |
| JP | 2-149615 A | 12/1990 |
| JP | 3-97413 | 10/1991 |
| JP | 4-138019 | 12/1992 |
| JP | 8-295411 | 11/1996 |

* cited by examiner

Primary Examiner—James R. Bidwell
(74) Attorney, Agent, or Firm—Nilles & Nilles SC

(57) ABSTRACT

A conveyor is provided with a casing (2), an endless conveyor belt (9) located in the casing (2) to circulate. The conveyor belt (9) has a pair of roller chains (11) attached to the peripheral edges on each side of the belt. Each roller chain (11) has a plurality of rollers (13). The casing (2) is provided with a lower split body (14) and an upper split body (15) fixed on the lower split body (14). The lower split body (14) has a pair of side frame members (17 and 18) formed by press molding. The side frames (17 and 18) each have a lower supporting portion (20) and an upper supporting portion (22), for supporting the rollers (13). That is, some portions of the casing (2) serve as the roller supporting portions (20,22). This reduces the number of steps in the manufacture of conveyors, facilitates manufacture of the same, and reduces the manufacturers' cost.

15 Claims, 11 Drawing Sheets

BELT CONVEYOR HAVING SUPPORT CASING FOR BELT

BACKGROUND OF THE INVENTION

The present invention relates to a conveying apparatus such as a chip conveyor.

A conveying apparatus, for example, a chip conveyor, includes a circulating conveyor belt. The conveyor belt carries chips formed during operation of machine tools. The conveyor belt is endless and has a plurality of rollers attached to peripheral edges on each side thereof at predetermined intervals. The chip conveyor has a casing enveloping the conveyor belt. A pair of bearing rails extending along the conveyor belt are fixed by means of welding or the like to the inner surfaces of the casing at locations opposite to the peripheral edges of the conveyor belt, respectively. The rollers attached to the conveyor belt are born by the bearing rails. The conveyor belt is circulated as the rollers roll over the bearing rails.

The bearing rails are independent from the casing. Thus, the number of components is increased, and an operation is required to fix the bearing rails to the casing by means of welding or the like. This not only increases the number of operation steps in the manufacture of the conveyors and complicates the manufacture but also increases the manufacturers' cost.

The present invention was accomplished to solve the problems described above, and it is an objective of the present invention to provide a conveying apparatus that can be manufactured easily and inexpensively.

SUMMARY OF THE INVENTION

In order to attain the above objective, the conveying apparatus according to the present invention is provided with an endless conveyor belt for feeding a material to be treated. The conveyor belt is contained in a casing and is able to circulate therein. Supporting members for supporting the conveyor belt are located within the casing. The conveyor belt circulates along the supporting members. The supporting members are formed integrally with the casing.

In the present invention, the supporting members are formed integrally with the casing. In other words, some portions of the casing serve as the supporting members. Thus, the number of components can be reduced compared with the case where the supporting members are formed independent from the casing, and there is no need for fixing the supporting members to the casing by means of welding and the like. This reduces in the number of operation steps in the manufacture of the conveying apparatus, facilitates the manufacture, and reduces the manufacturers' cost.

DETAILED DESCRIPTION OF THE PREFERRED EMBODIMENTS

The chip conveyor according to a first embodiment of the present invention will be described below referring to FIGS. 1 to 9.

As shown in FIGS. 1 to 5, the chip conveyor 1 has an elongated casing 2 and an endless conveyor belt 9 located in the casing 2 to circulate therein. The casing 2 is provided with an inverting section 4, a loading section 3, a curved section 5, an inclined section 6 and an unloading section 7 arranged successively from the left toward the right in FIG. 1. The loading section 3 extends horizontally. The inverting section 4 is connected to the distal end (left side end in FIG. 1) of the loading section 3. The curved section 5 is connected to the proximal end (right side end in FIG. 1) of the loading section 3 and is curved diagonally upward. The inclined section 6 is connected to the curved section 5 to extend therefrom diagonally upward. The unloading section 7 is connected to the upper end of the inclined section 6 to extend substantially horizontally. The inverting section 4, the loading section 3, the curved section 5, the inclined section 6 and the unloading section 7 are each welded with respect to the adjacent section or sections and/or part or parts.

Figure 1:
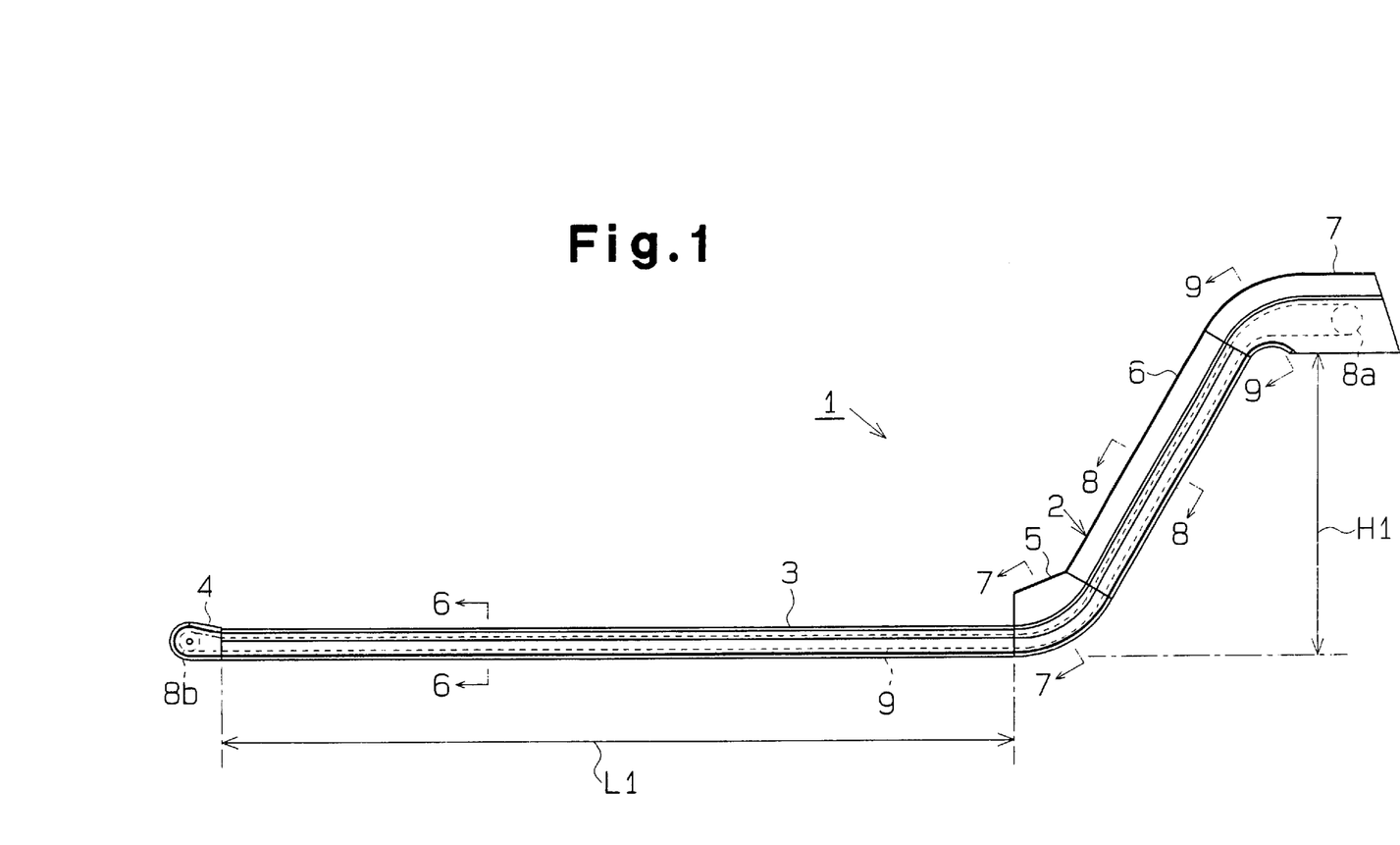
FIG. 1 is a front view showing a chip conveyor according to a first embodiment of the present invention.

For example, the loading section has a length L1 of 2500 mm, and the height H1 from the lower end of the loading section 3 to the lower end of the unloading section 7 is 950 mm. The chip conveyor 1 has a width W1 of 330 mm. A pair of driven sprockets 8b are rotatably supported in the inverting section 4. A pair of driving sprockets 8a are rotatably supported in the unloading section 7. The conveyor belt 9 is wrapped around and across the sprockets 8a and 8b.

Figure 2:
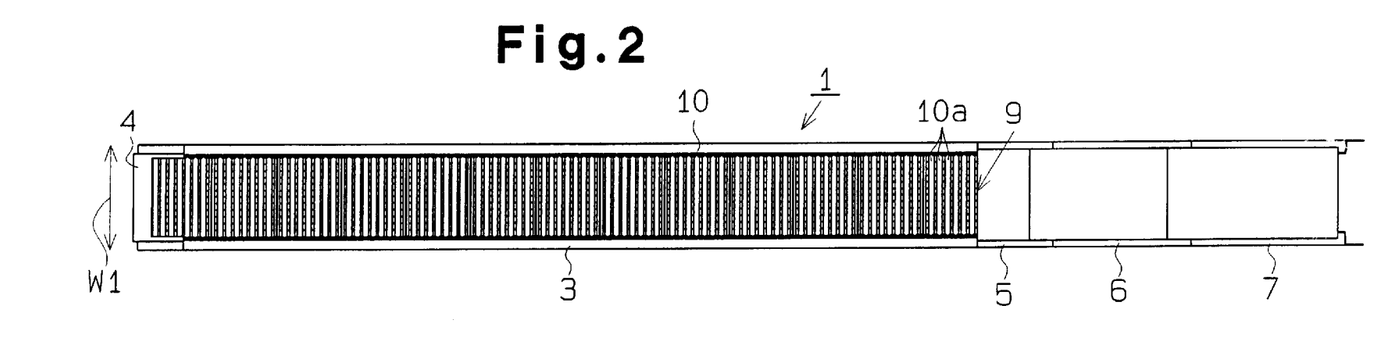
FIG. 2 is a plan view of the chip conveyor shown in FIG. 1.
Figure 3:
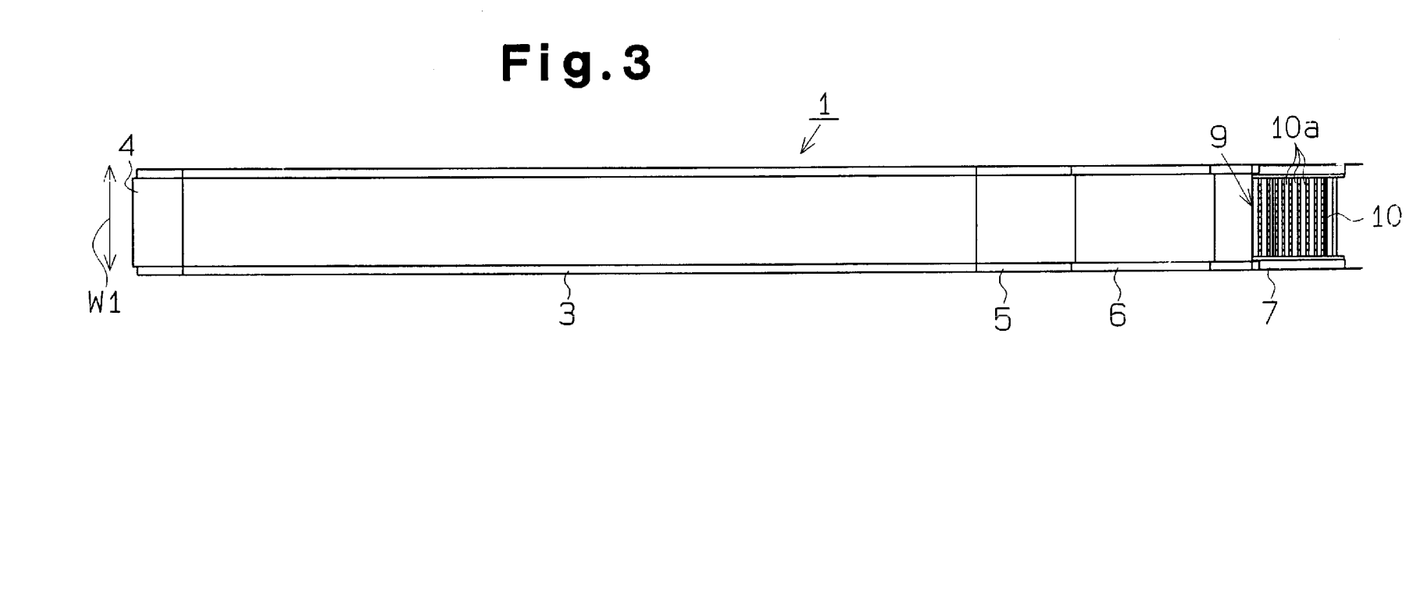
FIG. 3 is a bottom view of the chip conveyor shown in FIG. 1.
Figure 4:
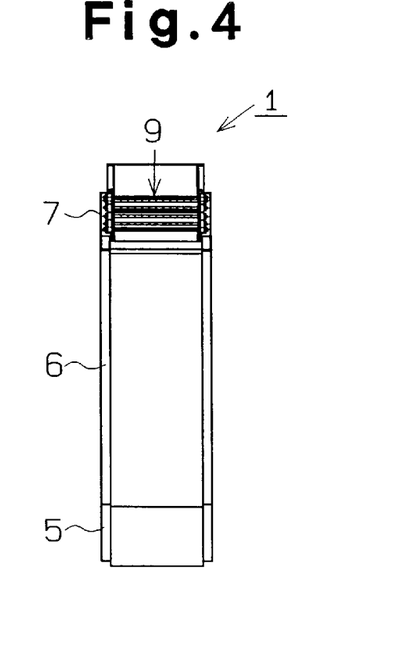
FIG. 4 is a right side view of the chip conveyor shown in FIG. 1.
Figure 5:
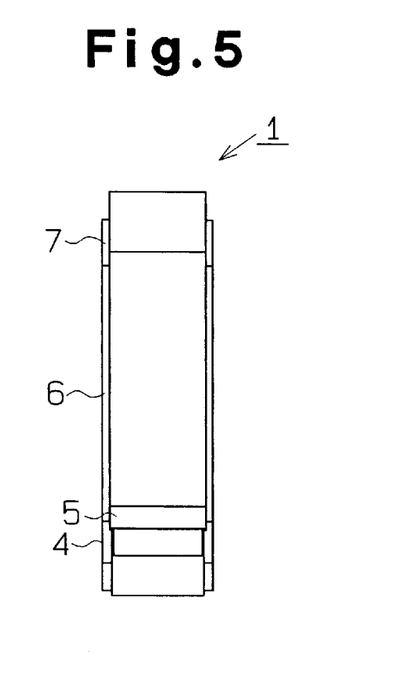
FIG. 5 is a left side view of the chip conveyor shown in FIG. 1.
Figure 6:
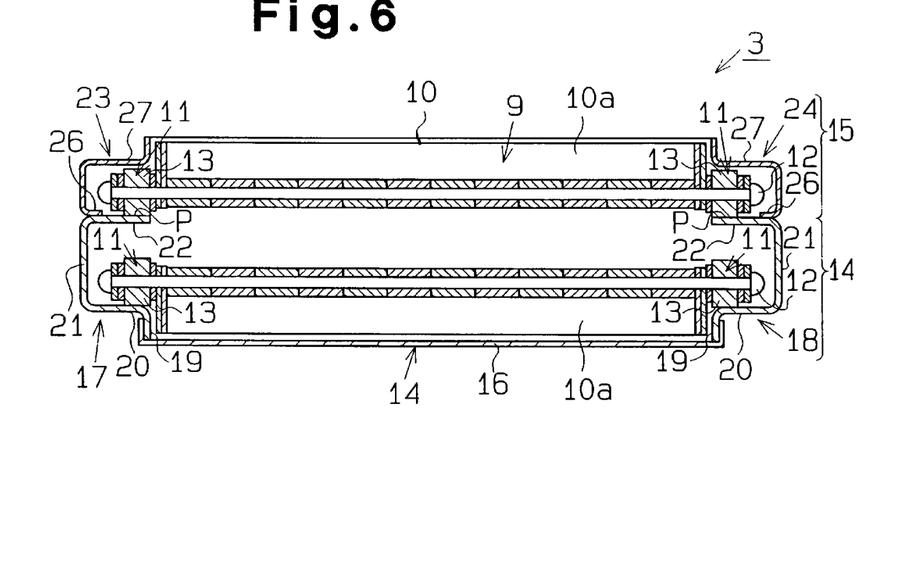
FIG. 6 is an enlarged cross-sectional view of the chip conveyor taken along the line 6—6 in FIG. 1.

As shown in FIGS. 2, 3 and 6, the conveyor belt 9 contains an endless belt body 10 formed by connecting a plurality of slats 10a, and a pair of roller chains 11 attached to the peripheral edges on each side of the belt body 10. Each slat 10a extends orthogonal to the direction in which the conveyor belt 9 circulates (belt circulating direction) or in the direction of the width of the belt 9. Every two adjacent slats 10a arranged in the belt circulating direction are connected to each other by a shaft 12 in the manner of a hinge. Each roller chain 11 has a plurality of rollers 13. Every two rollers 13 that oppose each other across the belt body 10 are supported rotatably by the shaft 12, which protrudes from both sides of the belt body 10. Each roller chain 11 is engaged with the sprockets 8a and 8b.

Figure 7:
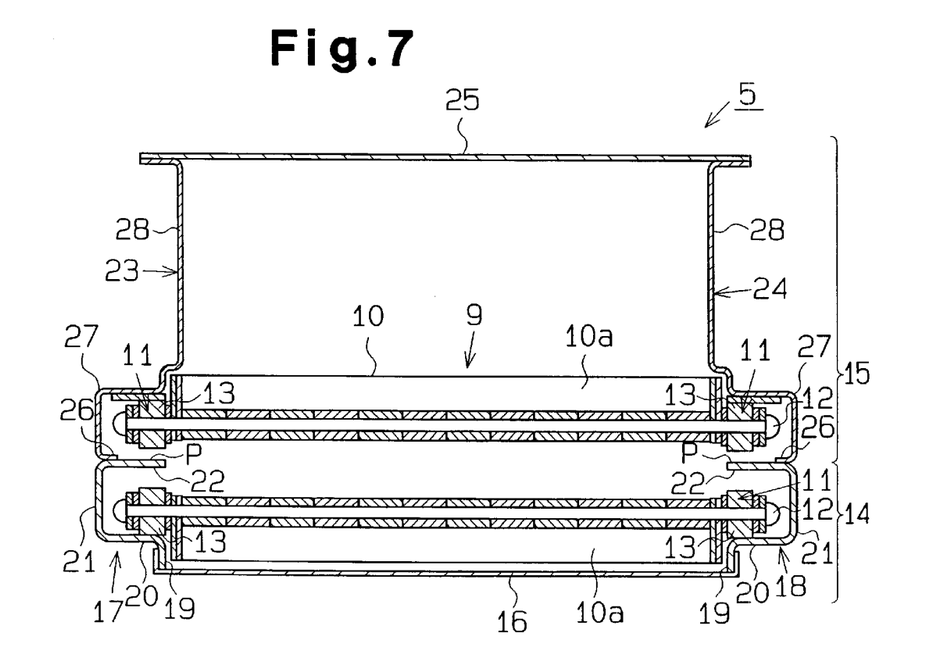
FIG. 7 is an enlarged cross-sectional view of the chip conveyor taken along the line 7—7 in FIG. 1.
Figure 8:
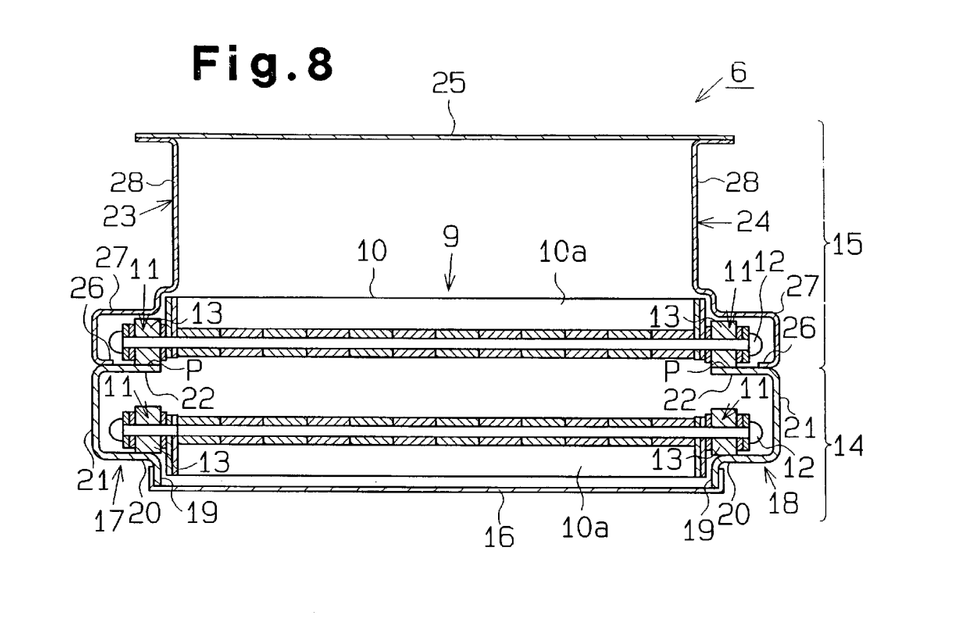
FIG. 8 is an enlarged cross-sectional view of the chip conveyor taken along the line 8—8 in FIG. 1.

Next, constitutions of the loading section 3, curved section 5 and inclined section 6 will be described specifically. As shown in FIGS. 6 to 8, these sections 3, 5 and 6 are each provided with a lower split body 14 and an upper split body 15. The lower split body 14 has a bottom plate 16 and a pair of side frame members 17 and 18 fixed on each side of the bottom plate 16. The side frame members 17 and 18 are each formed by bending a metal sheet by means of press molding. This bending forms a base 19, a lower supporting portion 20, which extends horizontally outward from the upper extremity of the base 19, a side wall 21, which extends upward from the outer extremity of the lower supporting portion 20, and an upper supporting portion 22, which extends inward from the upper extremity of each side wall 21, in each side frame member 17 (18). The bottom plate 16 is bent upward at each side, and the bases 19 are welded to the bends thus formed, respectively.

The lower half of each roller chain 11 is located in a space surrounded by the associated side frame member 17 (18). The lower supporting portion 20 supports the rollers 13 in the lower half of the roller chain 11. However, in the curved section 5 shown in FIG. 7, the rollers 13 in the lower half of each roller chain 11 may abut against the lower surface of the upper supporting portion 22.

The upper split body 15 includes a pair of side frame members 23 and 24, which are fixed to the side frame members 17 and 18 of the lower split body 14, respectively. The side frame members 23 and 24 are each formed by bending a metal sheet by press molding. As shown in FIGS. 7 and 8, the side frame members 23 and 24 in the curved section 5 and the inclined section 6 each have a projecting portion 27 and a side wall 28, which extends upward. A cover 25 is attached to the upper ends of the side walls 28 to cover the top of the upper split body 15. As shown in FIG. 6, the side frame members 23 and 24 in the loading section 3 are of the same configuration as those in the curved section 5 and the inclined section 6 except that the side walls 28 are omitted. Therefore, the upper split body 15 in the loading section 3 has an open top. As shown in FIGS. 6 to 8, an abutting portion 26 is formed by bending the lower end portion of each projecting portion 27, and the abutting portion 26 is welded to the associated upper supporting portion 22 of the lower split body 14.

The upper half of each roller chain 11 is located in a space surrounded by the upper supporting portion 22 and the projecting portion 27. The rollers 13 in the upper half of each roller chain 11 are supported on a bearing face P corresponding to the upper surface of the upper supporting portion 22. However, in the curved section 5 shown in FIG. 7, the rollers 13 in the upper half of each roller chain 11 occasionally abut against the inner surface of the projecting portion 27.

Figure 9:
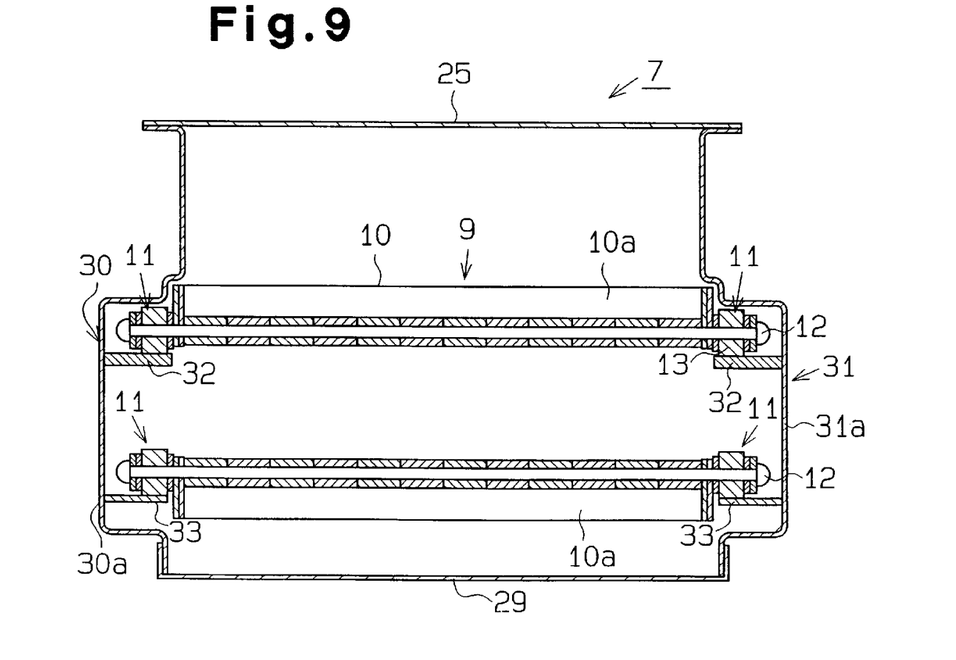
FIG. 9 is an enlarged cross-sectional view of the chip conveyor taken along the line 9—9 in FIG. 1.
Figure 10:
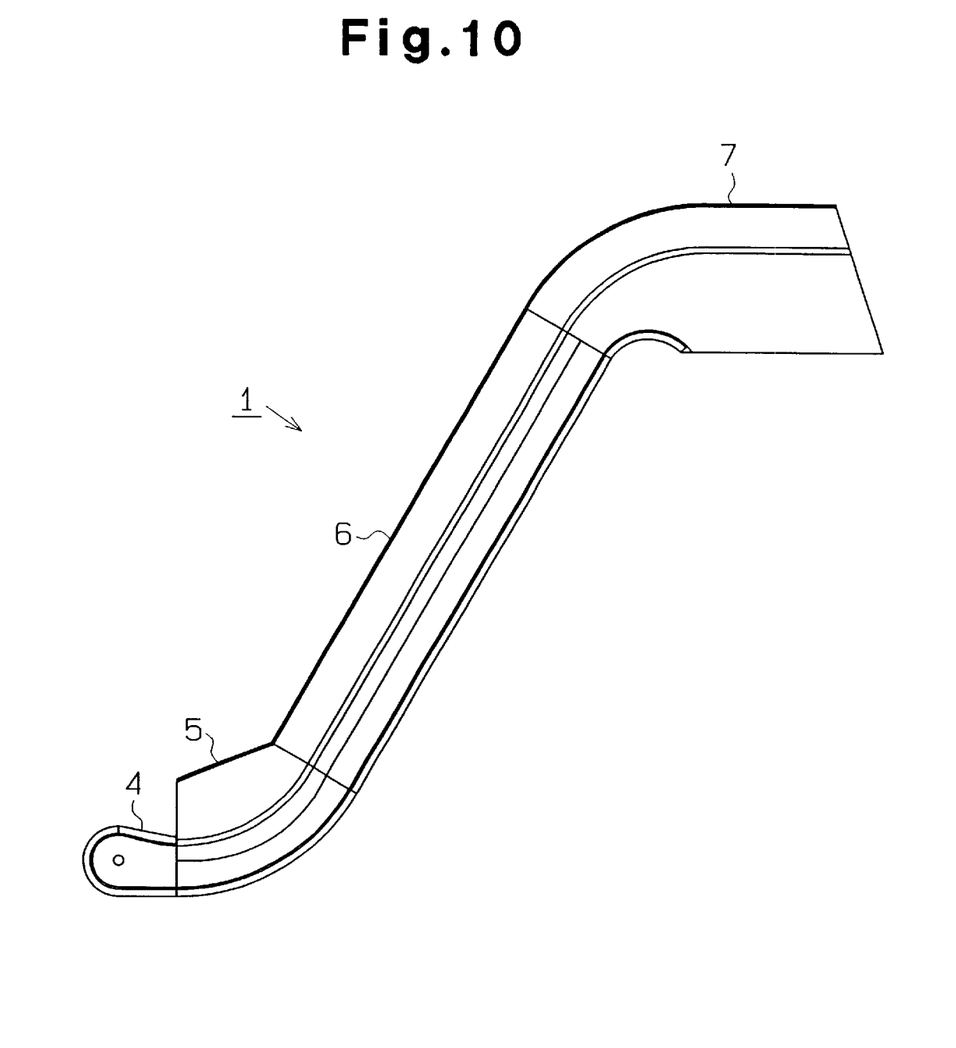
FIG. 10 is a front view showing a chip conveyor according to a second embodiment of the present invention having no loading section.
Figure 11:
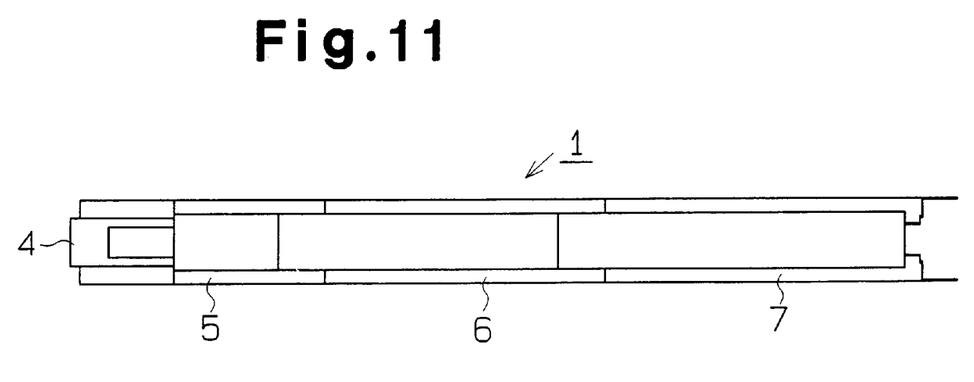
FIG. 11 is a plan view of the chip conveyor shown in FIG. 10.
Figure 12:
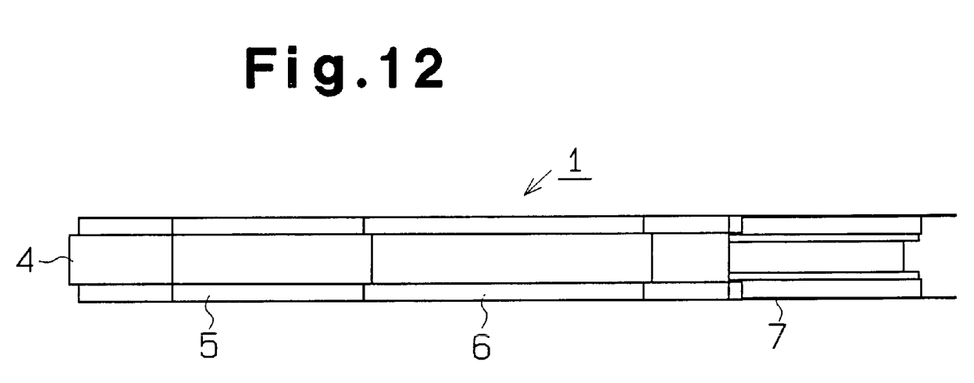
FIG. 12 is a bottom view of the chip conveyor shown in FIG. 10.
Figure 13:
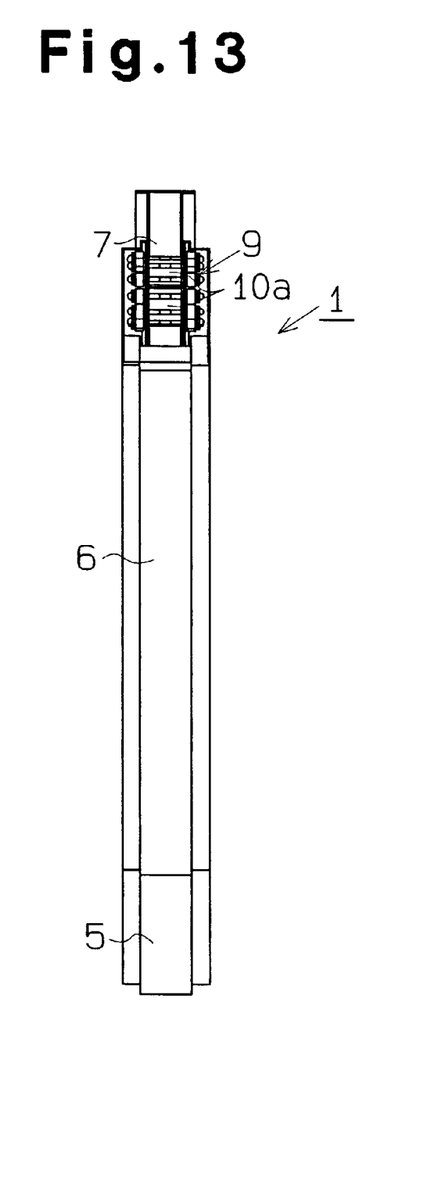
FIG. 13 is a right-side view of the chip conveyor shown in FIG. 10.
Figure 14:
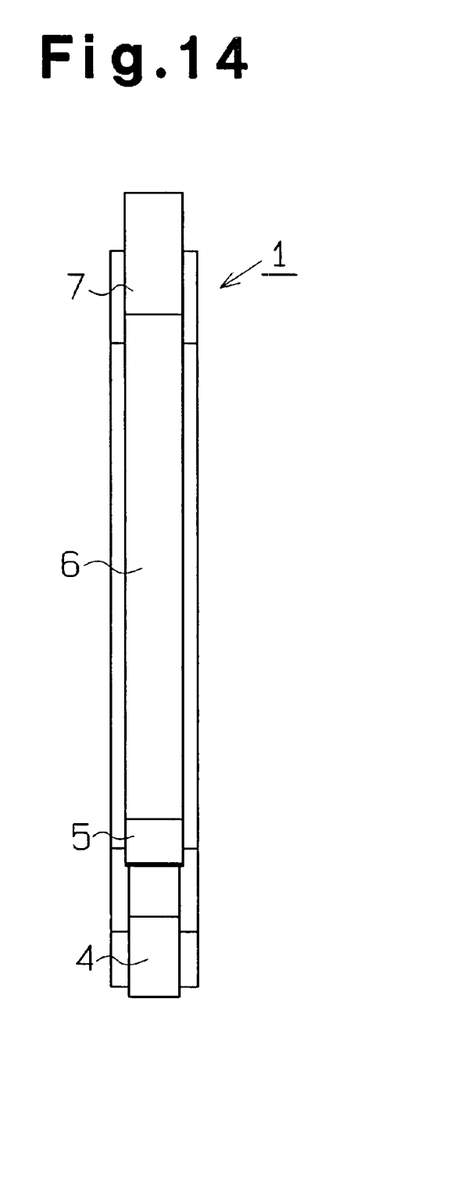
FIG. 14 is a left-side view of the chip conveyor shown in FIG. 10.
Figure 15:
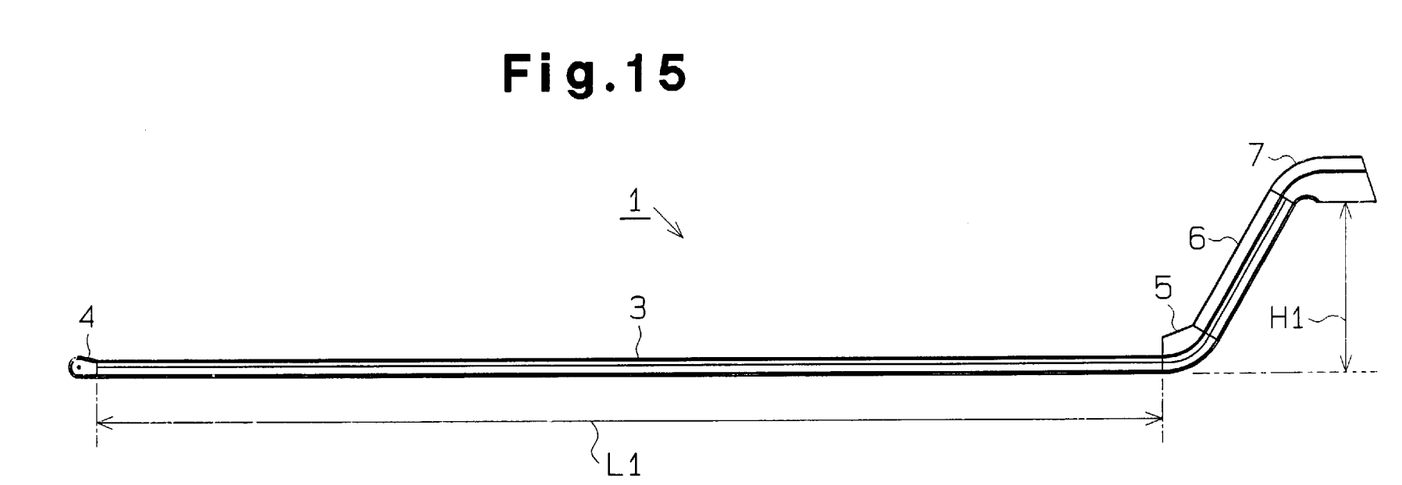
FIG. 15 is a front view showing a chip conveyor according to a third embodiment of the present invention having an elongated loading section.
Figure 16:
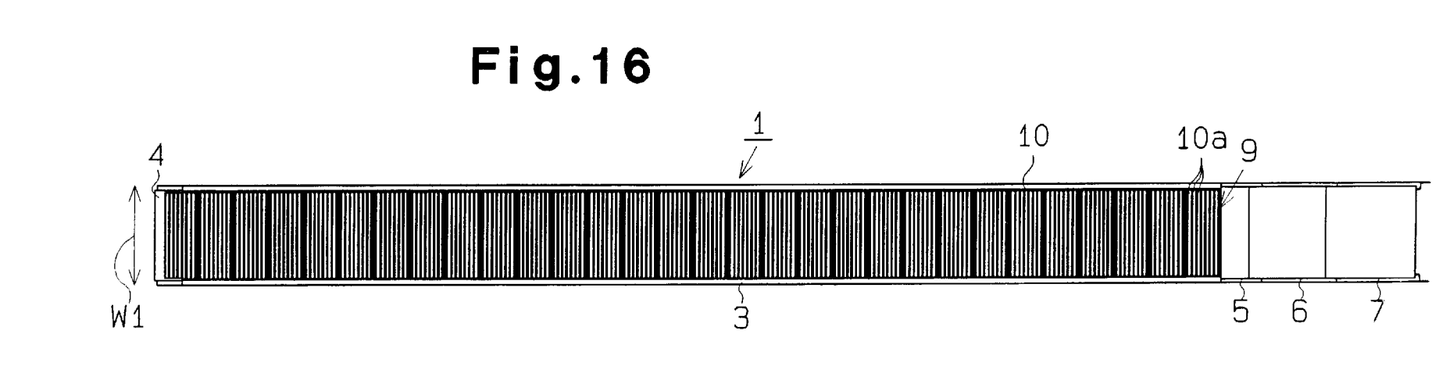
FIG. 16 is a plan view of the chip conveyor shown in FIG. 15.
Figure 17:
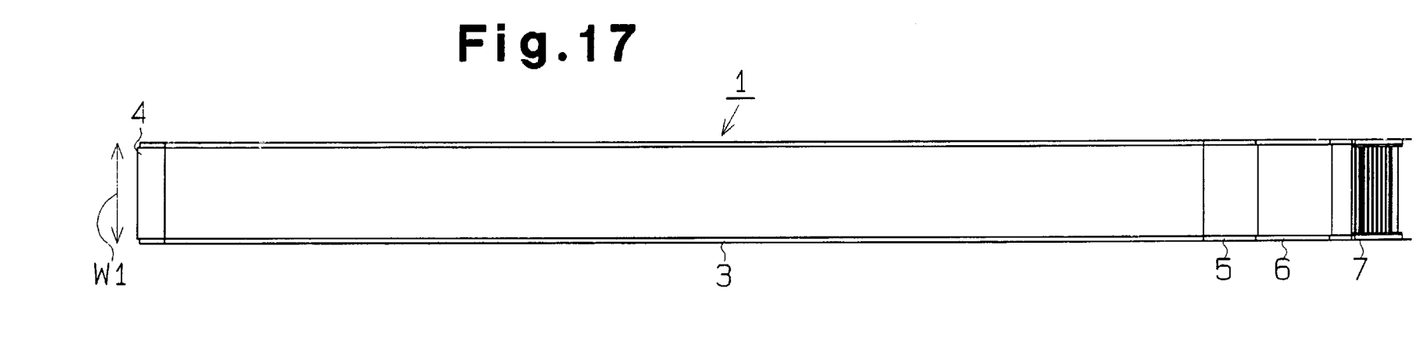
FIG. 17 is a bottom view of the chip conveyor shown in FIG. 15.
Figure 18:
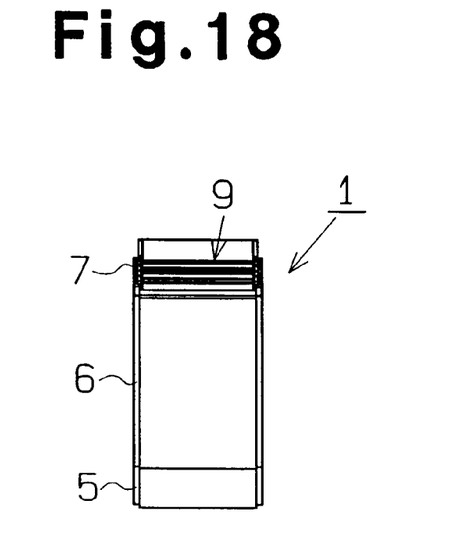
FIG. 18 is a right-side view of the chip conveyor shown in FIG. 15.
Figure 19:
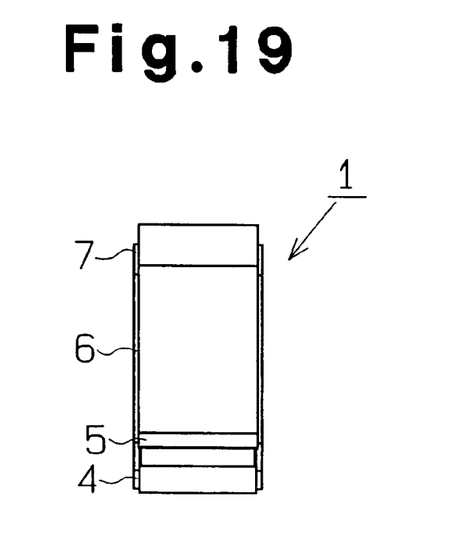
FIG. 19 is a left-side view of the chip conveyor shown in FIG. 15.

Next, the details of the unloading section 7 will be described. As shown in FIG. 9, the unloading section 7 has a bottom plate 29 and a pair of side frame members 30 and 31 welded to each side of the bottom plate 29. The side frame members 30 and 31 are formed by bending metal sheets by press molding. The side frame members 30 and 31 have projecting portions 30a and 31a, respectively. The roller chains 11 are located in spaces surrounded by the projecting portions 30a and 31a, respectively. An upper supporting plate 32 and a lower supporting plate 33 are welded to the inner surface of each projecting portion 30a (31a). The upper supporting plate 32 and the upper supporting portion 22 in the inclined section 6 are welded to each other at their opposing ends such that the former is continuous with the latter. Likewise, the lower supporting plate 33 and the lower supporting portion 20 in the inclined section 6 are welded to each other at their opposing ends such that the former is continuous with the latter. The supporting plates 32 and 33 support the rollers 13 of the roller chains 11.

Operation of the thus constituted chip conveyor 1 will now be described. For example, chips discharged from a machine tool (not shown) are loaded onto the conveyor belt 9 through the upper opening of the loading section 3. When a motor (not shown) drives the driving sprockets 8a, the turning force is transmitted to the roller chains 11 of the conveyor belt 9. Thus, each roller 13 of the roller chain 11 rolls over the upper and lower supporting portions 20 and 22 and over the upper and lower supporting plates 32 and 33 to circulate the conveyor belt 9. With this circulation of the conveyor belt 9, the chips loaded in the loading section 3 are fed to the unloading section 7.

Next, effects to be exhibited in this embodiment will be described below.

The supporting portions 20 and 22 for supporting the roller chains 11 provided on each side of the conveyor belt 9 are formed integrally with the casing 2. That is, some portions of the press-molded casing 2 serve as the roller supporting portions 20 and 22. Thus, the number of components is reduced compared with the case where the supporting portions 20 and 22 are independent from the casing 2, and there is no need for fixing the supporting portions 20 and 22 to the casing 2 by means of welding or the like. This reduces the number of operation steps in the manufacture of chip conveyors 1, facilitates manufacture of the same, and reduces the manufacturers' cost.

The loading section 3, the curved section 5, and the inclined section 6 are each divided into a lower split body 14 and an upper split body 15. When these two split bodies 14 and 15 are combined with each other, the upper split body 15 is first placed on the bearing faces P of the upper supporting portions 22 in the lower split body 14. In this state, the two split bodies 14 and 15 are welded to each other. This allows an operator to carry out stable welding without supporting the upper split body 15. The bearing faces P of the lower split body 14 are formed essentially to support the rollers 13 of the roller chains 11, respectively. Such use of the bearing faces P for supporting the upper split body simplifies the structure of the casing 2.

It should be noted here that the following modifications, for example, are acceptable in the embodiment of the present invention.

The loading section 3 formed in the casing 2 in the first embodiment described above may be omitted. In a chip conveyor of a second embodiment shown in FIGS. 10 to 14, the casing 2 has an inverting section 4, a curved section 5, an inclined section 6 and an unloading section 7 but no loading section.

The length L1 of the loading section 3, the height H1 from the lower end of the loading section 3 to the lower end of the unloading section 7, and the width W1 of the chip conveyor 1 can suitably be changed. For example, in a chip conveyor 1 shown in FIGS. 15 to 19, the ratio of the length L1 of the loading section 3 to the length of the inclined section 6 is great compared with that in the chip conveyor 1 of the first embodiment shown in FIG. 1. In the chip conveyor 1 shown in FIGS. 15 to 19, for example, the length L1 of the loading section 3, the height H1 from the lower end of the loading section 3 to the lower end of the unloading section 7 and the width W1 of the chip conveyor 1 are 6000 mm, 500 mm and 580 mm, respectively The upper supporting portions 22 may be formed not on the lower split body 14 but on the upper split body 15. In this case, the abutting portions 26 in the upper split body 15 and the upper supporting portions 22 in the lower split body 14 may be extended and shortened to form upper supporting portions 22 in the former and abutting portions 26 in the latter, respectively.

The bottom plate 16 and each side frame member 17 (18) in the lower split body 14 may be formed integrally with each other.

What is claimed is:

1. A conveyor comprising:
   an endless conveyor belt having first and second edge portions and a plurality of longitudinally spaced rollers along each of said first and second edge portions, wherein the conveyor belt has an upper section and a lower section, wherein the upper section is located directly over the lower section;
   a casing, wherein the casing includes a first body, a second body, and a pair of support members for supporting said rollers of the upper section of the conveyor belt, wherein one of the bodies corresponds to the upper section and the other body corresponds to the lower section, wherein the support members are formed integrally with the first body, and the support members are located on a boundary between the first body and the second body, and wherein the bodies are joined to each other such that the second body abuts against the first body.

2. The conveyor of claim 1, wherein the support members are inwardly extending portions of the casing.

3. The conveyor of claim 2, wherein each support member is a leg of a generally channel-shaped frame member.

4. The conveyor of claim 1, wherein the first body is a lower body, which is located below the second body, and the second body is supported by the first body.

5. The conveyor of claim 4, wherein the supporting members each have a bearing face for supporting the upper body and the conveyor belt.

6. The conveyor of claim 5, wherein the conveyor belt has two opposite edges, and a plurality of rollers are located near each of the edges to support the conveyor on the casing.

7. The conveyor of claim 1, wherein the conveyor belt has two opposite edges, and a plurality of rollers are located near each of the edges to support the conveyor on the casing.

8. The conveyor of claim 6, wherein the casing includes a side frame member located on each side of the conveyor belt, and each side frame member forms one of the supporting members.

9. The conveyor of claim 8, wherein the supporting members are upper supporting members for supporting the upper section of the conveyor belt, and each side frame member additionally forms a lower supporting member for supporting the lower section of the conveyor belt.

10. A conveyor comprising:
    an endless conveyor belt having first and second edge portions and a plurality of longitudinally spaced rollers along each of said first and second edge portions, wherein the conveyor belt has an upper section and a lower section, wherein the upper section is located directly over the lower section;
    a casing, wherein the casing includes a lower body, an upper body, and a pair of support members for supporting said rollers of the upper section of the conveyor belt, wherein the upper body corresponds to the upper section and the lower body corresponds to the lower section of the conveyor belt, wherein the support members are formed integrally with the lower body, and the support members are located on a boundary between the upper body and the lower body, and wherein the bodies are joined to each other such that the upper body rests on the lower body.

11. The conveyor of claim 10, wherein the supporting members each has a bearing face for supporting the upper body and the conveyor belt.

12. The conveyor of claim 10, wherein the conveyor belt has two opposite edges, and a plurality of rollers are located near each of the edges to support the conveyor on the casing.

13. The conveyor of claim 10, wherein the casing includes a side frame member located on each of two opposite sides of the conveyor belt, and each side frame member forms one of the supporting members.

14. The conveyor of claim 13, wherein the supporting members are upper supporting members for supporting the upper section of the conveyor belt, and each side frame member additionally forms a lower supporting member for supporting the lower section of the conveyor belt.

15. The conveyor of claim 14, wherein each side frame member is generally channel-shaped.

* * * * *